United States Patent

[11] 3,621,381

| [72] | Inventor | Edgar L. Eckfeldt<br>Ambler, Pa. |
|------|----------|----------------------------------|
| [21] | Appl. No. | 797,715 |
| [22] | Filed | Oct. 16, 1968 |
| [45] | Patented | Nov. 16, 1971 |
| [73] | Assignee | Leeds & Northrup Company<br>Philadelphia, Pa. |

[54] COULOMETRIC SYSTEM HAVING COMPENSATION FOR TEMPERATURE INDUCED VISCOSITY CHANGES
9 Claims, 5 Drawing Figs.

[52] U.S. Cl. .................................... 324/30 B,
204/195, 324/65 TC
[51] Int. Cl. ..................................... G01n 27/42,
G01r 27/02
[50] Field of Search ........................... 324/30, 30
B, 65 TC; 204/195, 1 T; 73/54, 55, 59

[56] References Cited
UNITED STATES PATENTS

| 3,208,926 | 9/1965 | Eckfeldt .................. | 324/30 X |
| 3,283,240 | 11/1966 | Spady ...................... | 324/30 |
| 2,837,913 | 6/1958 | Rich et al. ................ | 73/59 |
| 3,479,863 | 11/1969 | Kleiss ...................... | 73/54 |
| 3,480,032 | 11/1969 | Collins, Jr. .............. | 73/59 X |

*Primary Examiner*—Rudolph V. Rolinec
*Assistant Examiner*—Ernest F. Karlsen
*Attorney*—Woodcock, Washburn, Kurtz & Mackiewicz ABSTRACT: Because of solution flow rate variations occurring as a result of changes in the temperature of the sample solution passed into coulometric measuring cells, continuous coulometric systems of the prior art require use of a metering pump to maintain solution flow rate constant so as to permit accurate solution constituent concentration measurements. The invention permits accurate, continuous concentration measurements to be made coulometrically, independent of any flow rate variations caused by sample solution temperature changes. This is achieved through the use of a device (such as, for example, a thermistor) responsive to the coulometric current, which device develops an output varying with the changes in the concentration of the constituent to be measured and invariant with changes in the flow impedance of the sample solution caused by changes in its temperature.

COULOMETRIC SYSTEM HAVING COMPENSATION FOR TEMPERATURE INDUCED VISCOSITY CHANGES

BACKGROUND OF THE INVENTION

1. Field of the Invention

This invention relates to coulometric systems for continuously determining the concentration of a constituent in a gaseous or liquid sample solution, and is more particularly concerned with the provision of a reliable system for carrying out a continuous coulometric analysis, which system provides automatic correction for variations in the solution flow rate arising from changes in its temperature.

2. Description of the Prior Art

Continuous coulometric analysis of sample streams has been known for many years and generally involves the continuous passing of a sample stream into an electrolytic reaction zone where a coulometric process either directly, or through an intermediary, causes a quantitative reaction with the constituent to be measured. The operation of such coulometric systems is advantageously based upon fundamental considerations, including Faraday's law which establishes the relationship between the variables in the system by the equation $$(1) \quad N = (I/96,490\ F)$$

In equation 1, $N$ represents the concentration expressed as normality (equivalents per liter), $I$ represents the current in amperes, and $F$ represents the flow rate of the sample solution in liters per second.

From equation 1 it can be seen that the measured concentration $N$ will be proportional to the current $I$, providing the flow rate $F$ is kept constant. In the past, this has been accomplished by means of a solution-metering pump. While use of a gas or liquid metering pump provides an excellent way to carry out continuous coulometric analysis, the need for the pump adds an appreciable item of expense to the overall cost of the equipment.

In accordance with the present invention, the metering pump need not be utilized, and accurate determinations of the concentration of the constituent in a sample solution may be made independent of any change in the flow rate of the solution arising from changes in the solution temperature.

SUMMARY OF THE INVENTION

Briefly stated, in accordance with the invention, a method is provided for measuring the concentration of a constituent of a solution independent of change in the solution flow rate arising from changes in the temperature of the solution which comprises passing the solution at a flow rate which is substantially constant at any given temperature through a coulometric zone including current electrodes disposed for direct flow of current therebetween, passing through said electrodes a coulometric current of magnitude proportional to the concentration of the constituent in the solution, and generating from the coulometric current an output varying with change in the concentration of the constituent in said solution and invariant with changes in the flow rate of said solution arising from changes in its temperature.

Further, the present invention contemplates an improvement in a coulometric system having current electrodes for flow of current through a stream of solution flowing at a substantially constant rate at any given temperature in determination of the concentration of a constituent of the solution, which improvement comprises means responsive to the current for developing an output varying with changes in the concentration of the constituent and invariant with changes in the flow rate of said solution arising from changes in the solution temperature.

The present invention takes advantage of the fact that the flow of solution in the coulometric system may be controlled by providing a flow control means that has a definite and predetermined temperature-flow rate characteristic. The operation of the system of the invention depends on providing in the circuit of the coulometric cell a temperature-responsive electrical means with a characteristic that is selected with respect to the temperature characteristic of the flow control means, to introduce the desired compensation. This can be done, for example, by making the electrical means a temperature-sensitive resistance element, the temperature-resistance characteristic of which is selected to be the inverse of the temperature-flow rate characteristic of the flow control means. The resistance element is maintained at the same temperature as the flow control system. With such an arrangement, an output signal representative of the IR-drop voltage across the resistance element will indicate the coulometric cell current corrected for flow rate variations caused by solution temperature changes.

Operation of the equipment in accordance with the invention as exemplified above may be explained by substituting for the current $I$ into equation 1 its equivalent value $E/R$, where $E$ is the IR-drop voltage and $R$ is the ohmic value of the resistance element, and also substituting for the flow rate $F$ its reciprocal function $Z$, which may be termed the flow impedance.

$$(2) \quad N = (EZ/96,490\ R)$$

It will be observed that when the change in the resistance value $R$ with temperature is made to be identical with the change in flow impedance $Z$ with temperature, the ratio of the two will remain constant and the measured voltage $E$ will be proportional to the concentration $N$ regardless of flow change induced by change in temperature. Accordingly, an object of the invention is to establish the temperature-resistance characteristic of the electrical means to agree with the temperature-impedance characteristic of the sample solution passing through the flow control means.

In carrying out the invention in one from thereof, the flow control means may comprise a capillary tube fed by constant solution head. As will be demonstrated later, the temperature-impedance characteristic of such a system will be substantially proportional to solution viscosity. Accordingly, in this case, the temperature-responsive resistance means is characterized by a thermal coefficient of resistance substantially matching the thermal coefficient of viscosity of the sample solution. The aforesaid resistance means is maintained at the same temperature as the solution, either directly, as by being disposed in heat exchange relationship with the solution, or indirectly, as by automatic temperature control means, and develops an output voltage which is representative of the concentration of the constituent of the solution and of a value independent of changes in the viscosity of the solution caused by changes in the solution temperature.

DESCRIPTION OF DRAWINGS AND PREFERRED EMBODIMENTS

For further objects and advantages of the invention and for a more detailed discussion of preferred embodiments thereof, reference is to be had to the following description taken in conjunction with the accompanying drawings in which:

FIG. 1 graphically illustrates temperature-impedance characteristics for several types of flow control systems;

The flow system may be constructed in a variety of ways in accordance with the invention to achieve a definite and predetermined temperature-flow rate characteristic. In general, flow control can be accomplished by causing the sample fluid to flow through a flow impeding device, across which a constant differential pressure is maintained. The flow impeding device may take the form of a single or multiple constriction of some type, such as a narrow bore tube (a capillary), a nozzle, a porous frit or the like. A substantially constant pressure drop across the impeding means may be established with a liquid sample, for example, by connecting the inlet of the flow impedance to an elevated overflow chamber which allows excess sample solution to be discarded. The outlet pressure from the flow impeding device is held constant by permitting the sample fluid to discharge at constant head and atmospheric pressure.

For gaseous sample fluids a flow impedence of corresponding type may be used, and constant pressure drop across it can be maintained by using a conventional automatic pressure regulator upstream, and permitting the discharge to take place at constant atmospheric pressure. Alternatively, the inlet may be operated at constant atmospheric pressure and the discharge from the impedence device may be controlled constant at negative pressure using a pressure regulator in combination with a suitable pump.

Figure 1:
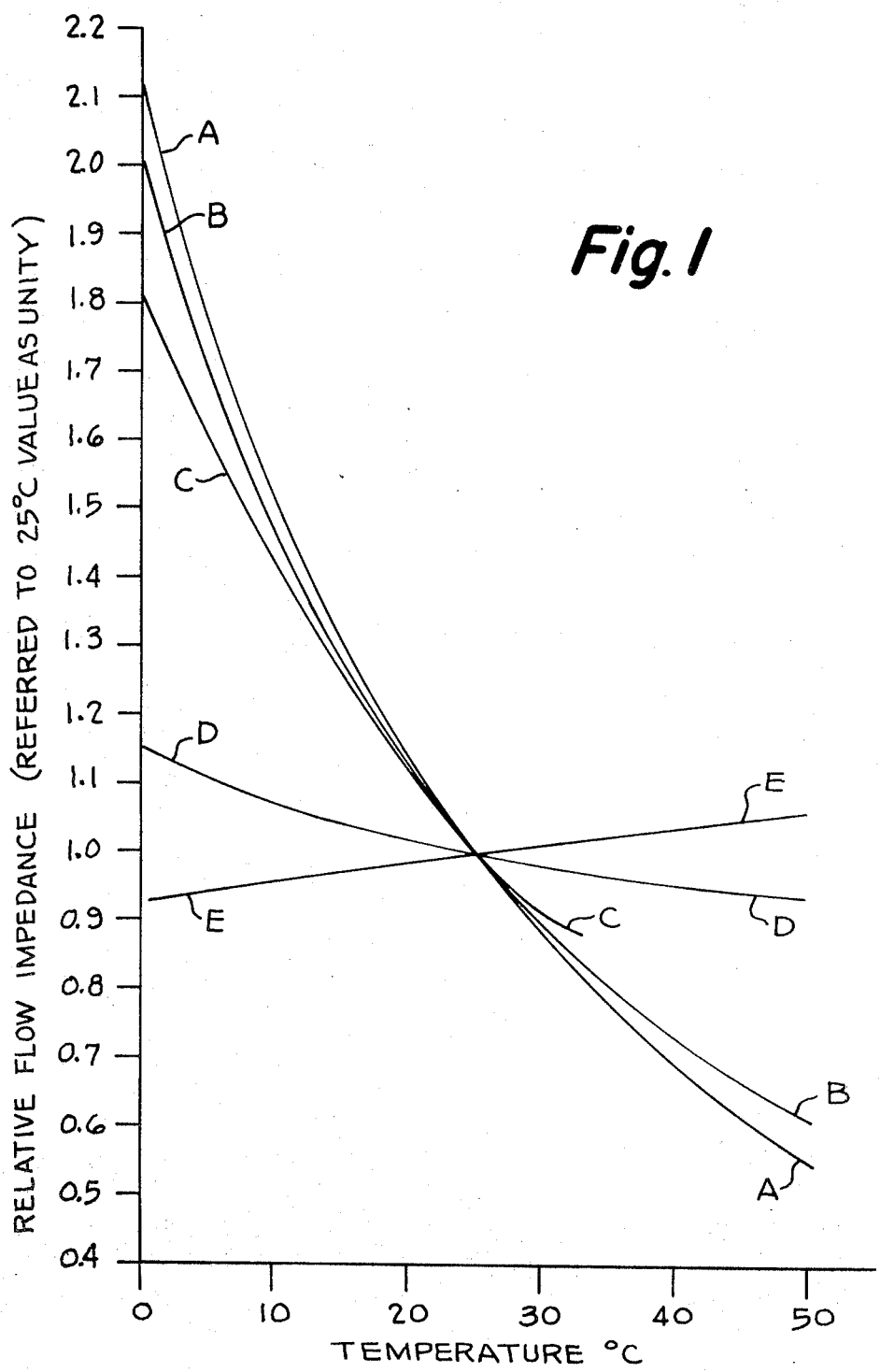

The flow characteristics of several types of flow control systems all operating at constant differential pressure are illustrated in the graph of FIG. 1. In this figure, flow impedence as a relative value referred to the 25° C. value is plotted as ordinate against temperature as abscissa. Curve A—A expresses the characteristics of a system comprising water flowing through a porous frit (Arthur H. Thomas Co. Cat. NO. 5307–J). Curve B—B shows the behavior of water flowing through a long capillary tube, in which case the temperature-flow impedence characteristic is equivalent to the viscosity of the sample water. Curve C—C shows the performance of a system similar to that of curve B-B, but in this case the capillary tube is of shorter length (6.2 cm. long and 0.38 mm. bore). Curve C—C is somewhat different from curve B-B because end effects become noticeable as the capillary becomes shorter in length. Curve D-D shows the impedence characteristics of water flow through a drawn glass nozzle having an aperture of 0.17 mm. diameter. Curve E—E illustrates the impedence characteristics of air flow through a long capillary tube, in which case the temperature-flow impedence relationship corresponds to the viscosity function of the air sample.

While viscosity of the sample fluid is important to consider, it will be the uniquely determining factor only in certain cases, namely, where long capillaries are used. In general, the temperature-impedance characteristic will be strongly influenced by the exact physical form of the actual flow impeding device used. If the capillary tube of curve C—C were reduced to half its length, for example, the characteristic curve would shift position and show even greater deviation from the viscosity-determined function of curve B—B. Other flow control systems which can be used in the practice of the present invention will readily occur to those skilled in the art.

IN applying the present invention, a suitable flow control system may be first devised to take care of particular circumstances associated with the measurement. The flow control system may take the form of one of the systems described above. The temperature-flow rate characteristic of the chosen system may next be determined experimentally, by measuring the actual flow rate of sample at various measured temperatures. Flow impedence may be obtained from flow rate by taking the reciprocal. The temperature-resistance characteristic of an electrical resistance means may then be selected or adjusted, following conventional techniques, to make this function agree with the experimentally determined temperature-flow impedence data. The resistance means may then be placed in a temperature zone corresponding to that of the sample flow system and connected in circuit with the coulometric cell. A signal voltage measured across this resistance means when the cell current flows through it will be indicative of the sample solution concentration and will be unresponsive to flow rate variation caused by temperature change.

Figure 2:
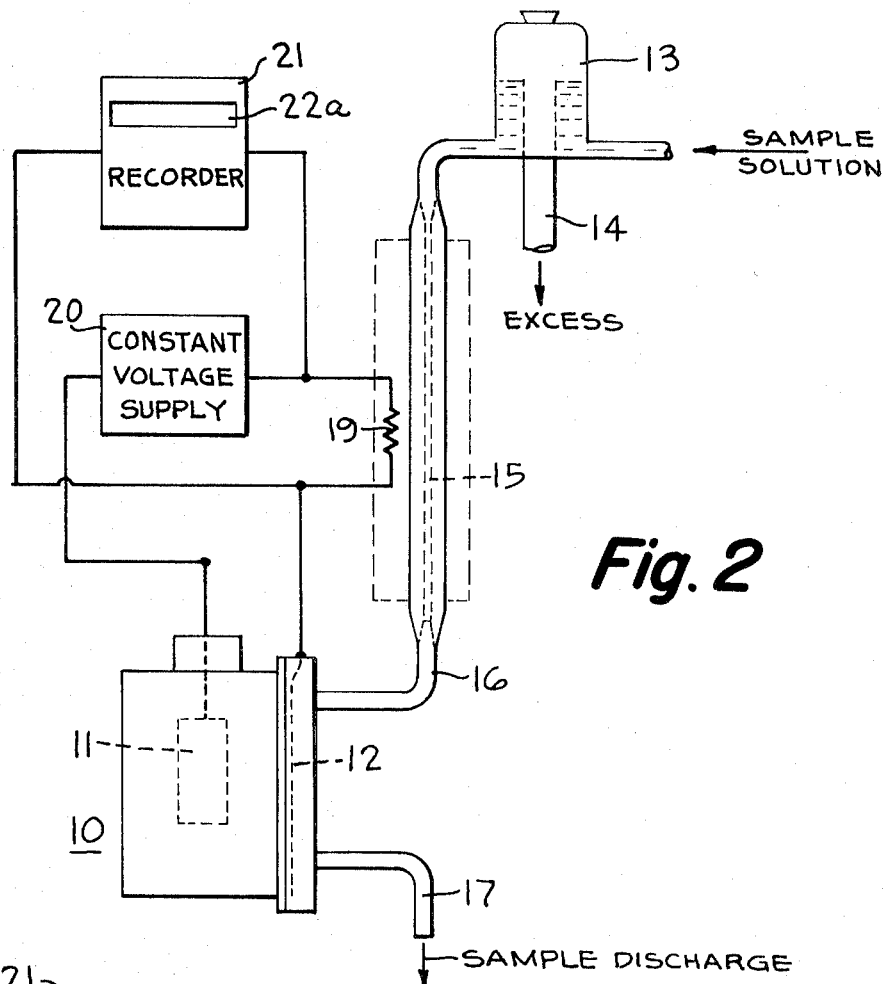
FIG. 2 illustrates a coulometric system embodying the present invention.

Referring now to FIG. 2, the coulometric cell 10 including reference electrode 11 and working electrode 12 carries out the coulometric process and is of the type more specifically described in my U.S. pat. No. 3,208,926, assigned to the assignee of the present invention. More particularly, the sample solution to be analyzed enters an overflow chamber 13 where the excess solution is discharged to a drain 14. Sample solution from the overflow chamber 13 flows through a long capillary tube 15 which, in conjunction with overflow chamber 13, produces a regulated constant flow of the sample solution through the supply line 16 into the coulometric cell 10 through which the solution passes and is discharged through the discharge channel 17. It will be noted that the solution head is kept constant by the constant level of the solution in the overflow chamber 13, and by the fixed position of the discharge channel 17. Under these circumstances, the flow of solution is controlled by the capillary tube and may be expressed by the Poiseuille equation as follows:

(3) $$V = \frac{3.1416 \, Pr^4 t}{8nL}$$

wherein: $V$ is the volume of the solution of viscosity $n$ that flows through the capillary of radius $r$ and length $L$ under the pressure $P$ in time $t$. This equation may then be rearranged to express the flow rate $V/t$ as follows:

(4) $$\frac{V}{t} = \frac{3.1416 \, Pr^4}{8nL}$$

IN applying equation 4 to the situation as shown in FIG. 2, it will be noted that the following variables are held constant: the pressure $P$ (head), the radius of the capillary $r$, and the length of the capillary $L$. The viscosity, $n$, will not be constant but rather will change with changes in the temperature of the solution and consequently will affect the flow rate F of the solution as shown by the equation (5) $F = (c_1/n)$ The symbol $c_1$ in equation 5 represents all of the constant factors enumerated above in equation 4 and accommodates to the flow rate units of equation 1. Equation 5 may then be substituted into equation 1 to give the following:

(6) $N = (In/96,490 \, c_1)$

In FIG. 2, the coulometric current is measured by measuring the voltage drop across the temperature variable resistor 19 in the circuit including the two electrodes of the coulometric cell. Expressing this as an equation leads to the following:

(7) $I = (E/R)$

Equation 6 may then be modified by substituting for the value of $I$ its equivalent as given in equation 7, as follows:

(8) $N = (En/96,490 \, c_1 R)$

Equation 8 indicates that the concentration of the constituent in the sample solution will be proportional to the voltage drop $E$ times the ratio of viscosity to resistance. The viscosity-to-resistance ratio is then made constant in any given case by selecting a resistance material for the resistor 19 having a temperature coefficient of resistance substantially matching the temperature coefficient of viscosity of the sample solution.

The viscosity of aqueous solutions decreases as the temperature rises to the extent of about 2 percent per degree centigrade. To hold the ratio $n//R$ constant under these circumstances, a resistance material is selected that decreases in resistance as temperature rises. A variety of thermistors well known to those skilled in the art are available for this purpose having this type of temperature resistance characteristic. Equation 8 may then be rewritten in a final form as follows:

(8) $N = c_2 E$

The constant $c_2$ combines the various constants and is equal to the expression (9) $c_2 = (n/96,490 \, c_1 R)$ In the operation of the system, the sample solution will pass from the overflow chamber 13 into the capillary tube 15 through the supply line 16 into the coulometric cell 10 through which it will subsequently pass and be discharged through the discharge channel 17. A suitable constant voltage applied to the cell from supply 20 will result in the flow of a coulometric current in the circuit of the cell having a magnitude proportional to the concentration of the constituent in the sample solution whose value is to be determined. This coulometric current flows through the resistor 19 to generate a voltage output which is indicated directly on the recorder 21 whose scale 22a may be calibrated directly in terms of the concentration of the constituent in the sample solution. The resistor 19 is a thermistor having a temperature coefficient of resistance which is identical to the temperature coefficient of viscosity of the sample solution flowing through the capillary tube. As shown in FIG. 2, the resistor 19 is placed in heat exchange relationship with the sample solution flowing through the capillary tube 15 so that any changes in the temperature of the solution flowing through the capillary tube will be reflected in the temperature of the resistor 19 thereby altering its resistance and consequently the voltage output across it. Thus, as will be seen from equation 8, the value of the ratio $n/R$ is maintained constant, and the voltage output across the resistor 19 may be maintained proportional to the concentration of the constituent in the sample solution.

It should be noted in FIG. 2 that the temperature variable resistor R is shown to be located within the flow control temperature zone. In this connection it should be understood that the temperature variable resistor may be mounted directly in the flowing stream of sample solution, or it may be mounted adjacent to the capillary as shown, in a region that is at the same temperature as the capillary and solution.

Figure 3:
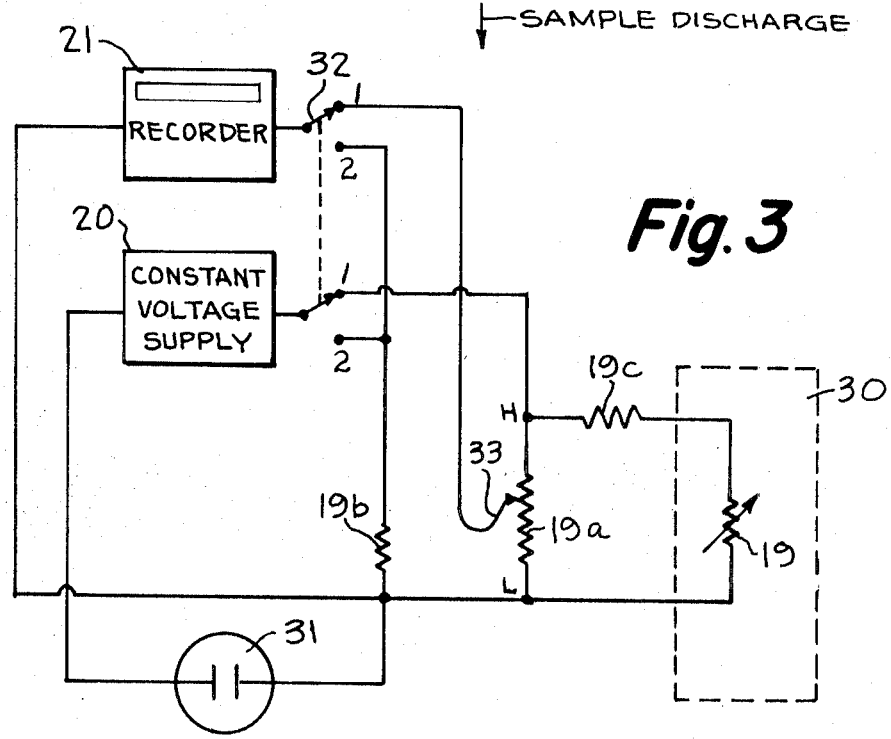
FIG. 3 illustrates another embodiment of the invention and in particular comprises an illustration of a modification of the circuit shown in FIG. 2.

Modification of the circuit shown in FIG. 2 is illustrated in FIG. 3. In the latter figure, the temperature sensitive resistor 19 is located in the flow control zone 30 including a capillary tube (not shown) through which sample solution passes from an overflow chamber (not shown) as illustrated in FIG. 2. A constant voltage supply 20 is used in a manner similar to that shown in FIG. 2.

The arrangement shown in FIG. 3 has several advantages over the arrangement shown in FIG. 2. Notably, by using in combination with resistor 19 the resistors 19a and 19c it is easier to obtain a match with the temperature-impedance characteristics of the sample solution in the flow system. The effective temperature coefficient of the network comprising the resistors 19, 19a, and 19c, can be modified by selecting appropriate values for the resistors 19a and 19c. It should be understood that a network of constant and temperature sensitive resistors other than that shown may be used to obtain the desired match in function, in accordance with techniques well known to those skilled in this art.

With the switch 32 in position 1 as indicated, the circuit arrangement is such as to introduce the automatic compensation which has been described. When the contact 33 of 19a is moved in a direction towards the point H a greater amount of response of the recorder 21 is obtained for a given signal current from the cell 31. MOving the contact 33 towards the point L reduces the recorder response.

When the switch 32 is turned to the position 2, automatic compensation no longer exists. Instead, the cell current flows through the calibrated fixed resistor 19b. In this mode of operation the recorder 21 observes the voltage drop across the resistor 19b. The values of the resistor 19b is chosen with due regard to the millivolt calibration of the recorder so that the recorder will read in terms of precisely known values of current.

In this manner, the precise value of the cell current may be measured. With the equipment operating in this fashion, a fundamental measurement of the sample solution concentration can be made. The solution flow rate may be initially measured at any particular temperature by measuring the time taken for the cell to discharge a known volume of solution. This may be accomplished by collecting the cell discharge in a volumetric flask or cylinder and timing the operation with a stopwatch. The solution concentration may be calculated by means of equation 1 from the measured values of the solution flow rate and the current. Alternatively, a solution of known concentration may be passed through the equipment to furnish a reading. In either case, this information will then enable a correct setting to be obtained for the contact of the resistor 19a when the switch is turned back to position 1. The recorder which can be calibrated directly in terms of the concentration being measured is made to read the correct value by adjusting the contact position.

Figure 4:
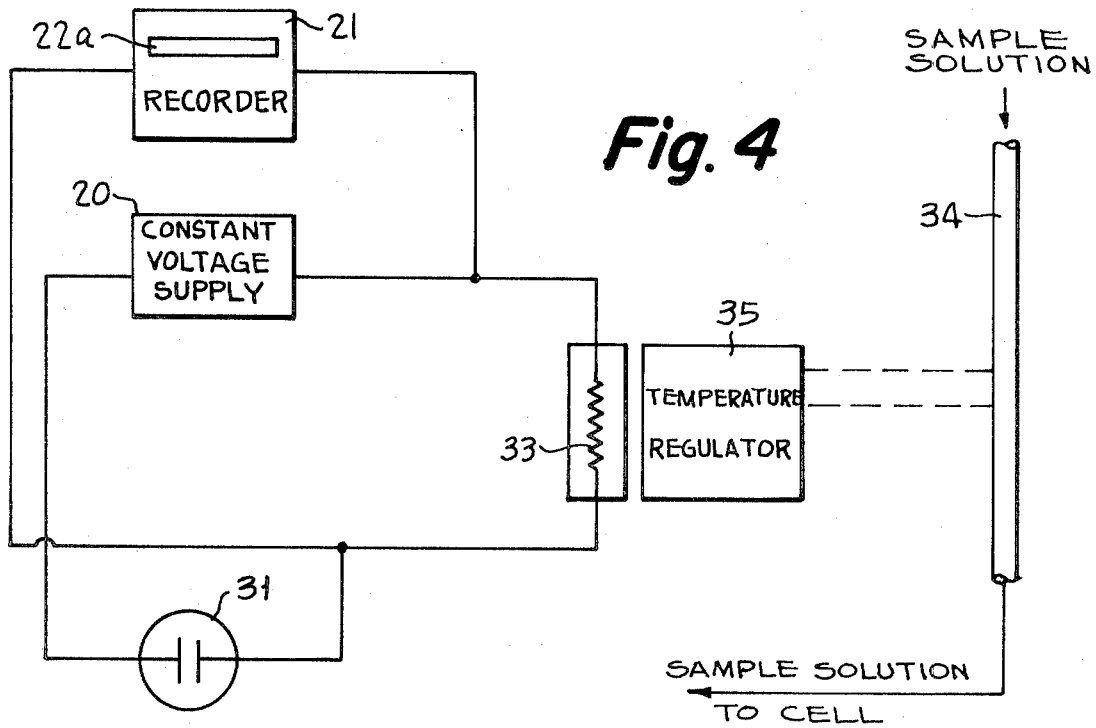
FIG. 4 illustrates a further embodiment of the invention.

FIG. 4 illustrates a modification of the system of the invention including a coulometric cell 31, a constant voltage supply 20 and a temperature variable resistor 33 having a temperature coefficient of resistance substantially matching the temperature coefficient of impedance of the flow system 34 through which the sample solution passes before going into the cell 31 for analysis. As shown in FIG. 4, the temperature variable resistor 33 is disposed in a temperature control zone whose temperature is maintained at the same value as the temperature of the sample solution by means of the temperature regulator 35 which monitors the temperature of the sample solution flowing in the conduit 34 and into the cell 31. Temperature regulator 35 may comprise any suitable temperature regulation mechanism such as a thermostat control, for instance, used in combination with an electric heater or resistance element whose temperature is maintained at the same temperature as that of the sample solution and which is maintained in heat exchange relationship with the temperature responsive resistor 33 disposed in the coulometric circuit.

Figure 5:
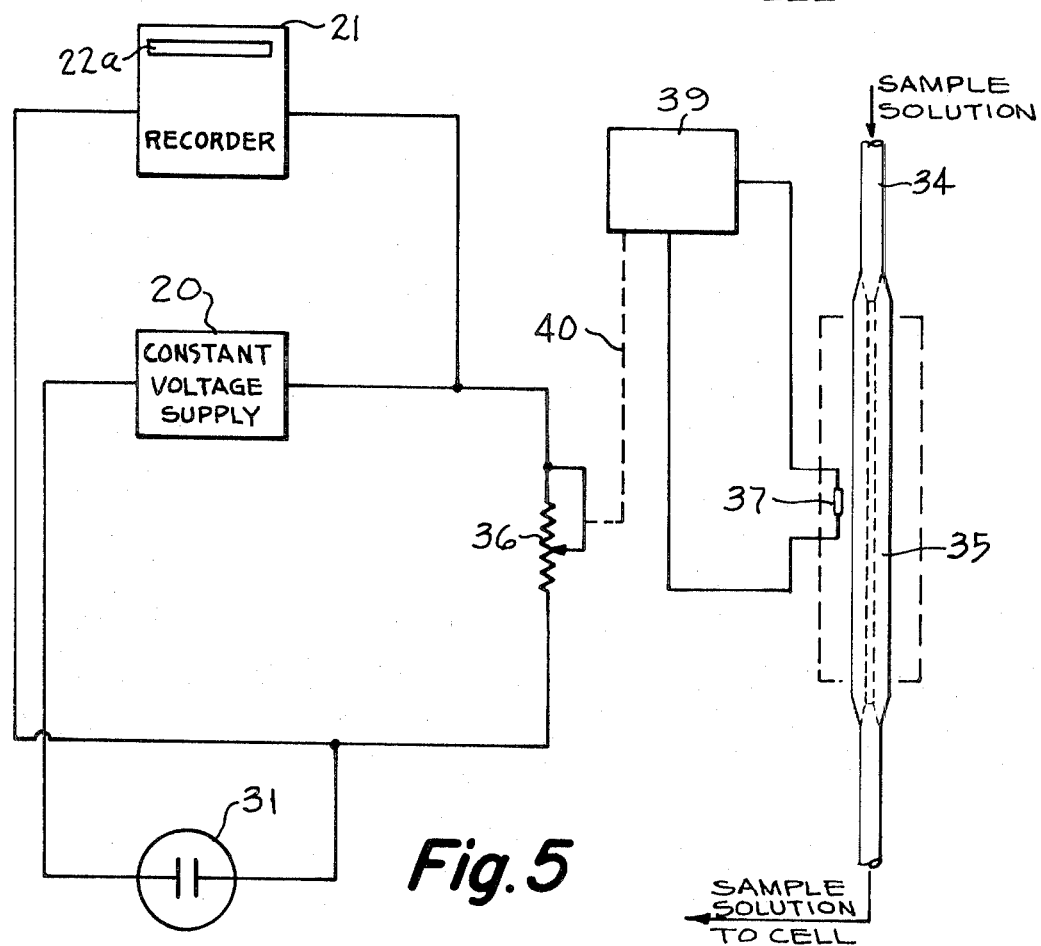
FIG. 5 illustrates a further modification in accordance with the invention.

FIG. 5 is illustrative of yet a further embodiment of the invention and shows a system including the coulometric cell 31, the constant voltage supply 20 and the recorder adapted to read the voltage drop across the variable resistor 36 disposed in the coulometric circuit. As in FIG. 2, the voltage output across the resistor 36 may be indicated directly on the recorder 21 whose scale 22a may be calibrated directly in terms of the concentration of the constituent in the sample solution under measurement. As shown in FIG. 5, the temperature sensor 37 of electrical, bimetallic, hydraulic or other conventional type is disposed in heat exchange relationship with the sample solution and flow impedance 35. Suitably connected to sensor 37 is a companion device 39 that positions a responsive member to correspond to the temperature of sensor 37. The sensor 37 may be a thermocouple or resistance thermometer, and the companion device 39, a servobalance system such as a temperature recorder. A linkage 40 from the temperature positioned member of device 39 serves to adjust the ohmic value of resistor 36 in relation to the temperature of sensor 37. By appropriately designing the sensor 37, the positioning device 39, the linkage 40 and the resistor 36, using conventional techniques, any desired functional relationship can be established between the temperature and the corresponding resistance value of resistor 36. In accordance with the present invention the equipment is arranged to produce a temperature-resistance function corresponding to the temperature-flow impedance characteristic of the particular flow control means used. If the flow control means happens to be a relatively long capillary, as depicted in FIG. 5, its temperature-impedance characteristic will be substantially the same as the temperature-viscosity function of the sample solution.

It should be understood that the sensor 37 of FIG. 5 may be a temperature sensitive resistor having exactly the desired temperature-resistance function to match the temperature-impedance characteristics of flow system. In this case, the positioning device 39 and linkage 40 serve to adjust resistor 36 in a manner to duplicate exactly the resistance value of sensor 37.

As will be appreciated from FIGS. 4 and 5, various means may be employed to vary the magnitude of a resistor disposed within the coulometric circuit to provide compensation for changes in the temperature of the sample solution and consequent changes in the solution flow rate due to the alterations in the flow impedance It will be appreciated, for example, that the systems of FIGS. 4 and 5 may be combined, i.e. the temperature variable resistor 37 need not be disposed in heat exchange relationship with the sample solution 34 but rather may be monitored by a temperature regulator such as shown in FIG. 4. Alternatively, the temperature regulating means of either FIG. 4 or FIG. 5 may be employed to vary the magnitude of resistance of one of a combination of resistors employed in the coulometric circuit to obtain a match with the temperature viscosity characteristics of a sample solution, as shown in FIG. 3.

As has been noted, the temperature-sensitive electrical means used with liquid sample solutions may conveniently depend on an element having a negative coefficient (a thermistor), because viscosity, and hence flow impedance usually decreases with increasing temperature. With gases, the viscosity, and therefore the flow impedance, will generally increase with rise in temperature, exemplified by curve E—E of FIG. 1. Accordingly, with gases it will be convenient to use an element with a positive temperature coefficient, such as nickel, platinum or copper wire. The temperature-resistance characteristic is adjusted to match the temperature-impedance characteristic of the gas flow, in a manner analogous to that described for liquid flows.

Although a capillary tube has been employed in several of the figures to exemplify one method by which the flow of sample solution may be maintained constant (excepting, of course, for changes due to the effect of the temperature), it should be understood, as has already been mentioned, that other means of controlling the flow of sample solution into the coulometric cell may be employed in the practice of the invention. It should be further understood, that the flow impedance means need not necessarily be located in the flow line ahead of the cell but may be placed in the line leading from the cell. In this respect, it has been found that the coulometric cell itself may provide a flow control means. Such a coulometric cell is better described in my U.S. Pat. No. 3,208,926 and includes a flow channel having a tortuous path for flow of the sample solution therethrough. Means for controlling the sample solution flow other than those stated will readily occur to those skilled in the art.

Generally speaking, the present invention is applicable to and may be used in conjunction with any coulometric cell such as, for example, described in my aforesaid U.S. Pat. No. 3,208,926 as well as in my U.S. Pat. No. 2,621,671, also assigned to the assignee of the present invention.

The present invention is thus seen to afford a significant contribution in the art of coulometric analysis and permits continuous coulometric analysis to be conducted of sample solutions whose temperature and viscosity vary during the period of measurement. It is to be noted in this regard that in the event of significant variation in the value of the temperature of the sample solution, any appreciable changes in the solution density and other factors that affect flow, caused by the temperature change, may also be compensated for by the temperature variable resistor which is either disposed within the coulometric circuit, or is disposed without the circuit and is used to control another resistor which is disposed in the coulometric circuit, to compensate for any effect that the changes may have upon the flow rate of the solution through the coulometric cell.

It should be understood that although the present invention has been described in considerable detail with respect to certain specific embodiments thereof, it is not to be considered so limited and may be used in other ways without departing from the spirit of the invention or the scope of the appended claims.

What is claimed is:

1. In a coulometric system having current electrodes for flow of current through a stream of solution flowing at a substantially constant rate at any given temperature in determination of the concentration of a constituent of the solution, the improvement comprising:
    means responsive to said current for developing an output varying with changes in the concentration of said constituent and invarient with changes in the flow rate of said solution due solely to changes in its temperature, said means responsive to said current comprising variable resistance means connected in circuit with said electrodes for developing an output voltage representative of the concentration of said constituent in said solution, and
    means external to said circuit responsive to changes in the temperature of said solution for varying the resistance of said variable resistance means with changes in the flow rate of said solution due solely to changes in its temperature to maintain said output voltage representative of the concentration of said constituent.

2. A coulometric system for measuring the concentration of a constituent of a solution, including:
    a coulometric cell having current electrodes disposed for flow of current therebetween,
    flow control means having a definite and predetermined temperature-flow rate characteristic for control of delivery of solution to said cell for maintaining the flow of solution to said cell constant at any given temperature,
    means for passing through said electrodes a coulometric current of magnitude proportional to said constituent,
    means for producing a measurable voltage produced by said current, and
    temperature responsive means having a temperature characteristic related to said temperature-flow rate characteristic of said flow control means to continuously alter said measurable voltage in a manner to render it invariant with changes in the flow rate of solution in said cell due to change of the temperature of said solution.

3. The coulometric system of claim 2 wherein,
    said flow control means includes means for delivering said solution to said cell at a constant pressure, and
    said cell includes a solution flow channel for maintaining the flow of said solution through said cell constant at any given temperature.

4. The coulometric system of claim 2 in which said flow control means comprises a flow impedance device.

5. The coulometric system of claim 4 in which the flow impedance device comprises a capillary tube.

6. A coulometric system for measuring the concentration of a constituent of a stream of solution, comprising:
    flow control means having a definite and predetermined temperature-flow rate characteristic for regulating the rate of flow of said stream of solution,
    means including electrodes for causing an electric current to flow through said stream of solution,
    means responsive to said flow of electrical current through said stream for developing an output signal that is proportionally related to the concentration of said constituent in said solution, and
    temperature responsive means disposed to respond to the temperature of the solution of said stream, said temperature responsive means having a temperature characteristic related to said temperature-flow rate characteristic of said flow control means to effect a modification of said output signal in a manner to render said output signal invariant with changes in the flow rate of said stream of solution due solely to changes in solution temperature.

7. The coulometric system of claim 6 in which the means responsive to said electrical current includes a temperature-responsive means having an impedance element in heat exchange relation with said solution of said stream.

8. The coulometric system of claim 6 in which
    said means responsive to said flow of electrical current comprises a variable resistance means connected in circuit with said electrodes for developing an output voltage representative of the concentration of said constituent in said solution, and
    said temperature responsive means comprises a means external to said circuit responsive to changes in the temperature of said solution for varying the resistance of said variable resistance means with changes in the flow rate of said solution due solely to changes in its temperature to maintain said output voltage representative of the concentration of said constituent.

9. The coulometric system of claim 6 in which the temperature responsive means includes a resistance element providing a thermal coefficient of resistance substantially matching the thermal coefficient of viscosity of said solution and is maintained at the temperature of said solution for developing an output voltage representative of the concentration of said constituent and of a value independent of changes in the viscosity of said solution due to changes in its temperature.

* * * * *